US010051318B2

(12) United States Patent
Beckett et al.

(10) Patent No.: US 10,051,318 B2
(45) Date of Patent: Aug. 14, 2018

(54) SYSTEMS AND METHODS FOR PROVIDING IMMERSIVE MEDIA CONTENT

(71) Applicant: NBCUniversal Media, LLC, New York, NY (US)

(72) Inventors: William Beckett, Englewood Cliffs, NJ (US); Howard Shirokmann, Englewood Cliffs, NJ (US); Peter Ehrhardt, New York, NY (US); James Benjamin, New York, NY (US); Gerald Schultz, New York, NY (US); Brian Davis, New York, NY (US); Francis Biancamano, New York, NY (US)

(73) Assignee: NBCUniversal Media LLC, New York, NY (US)

( * ) Notice: Subject to any disclaimer, the term of this patent is extended or adjusted under 35 U.S.C. 154(b) by 0 days.

(21) Appl. No.: 14/788,269

(22) Filed: Jun. 30, 2015

(65) Prior Publication Data

US 2017/0006334 A1 Jan. 5, 2017

(51) Int. Cl.

| | |
|---|---|
| ***H04N 7/173*** | (2011.01) |
| ***H04N 21/436*** | (2011.01) |
| ***H04N 21/2187*** | (2011.01) |
| ***H04N 21/2665*** | (2011.01) |
| ***H04N 21/43*** | (2011.01) |
| ***H04N 21/8547*** | (2011.01) |

(52) U.S. Cl.

CPC ... *H04N 21/43615* (2013.01); *H04N 21/2187* (2013.01); *H04N 21/2665* (2013.01); *H04N 21/4307* (2013.01); *H04N 21/8547* (2013.01)

(58) Field of Classification Search

CPC combination set(s) only.
See application file for complete search history.

(56) References Cited

U.S. PATENT DOCUMENTS

2004/0119729 A1* 6/2004 Covannon ............ G06F 3/1423 345/690
2005/0024488 A1* 2/2005 Borg ..................... G06Q 30/06 348/36
2007/0015579 A1* 1/2007 Masaki ............. H04N 5/23203 463/37
2009/0129753 A1* 5/2009 Wagenlander ......... G11B 27/10 386/326
2010/0275235 A1* 10/2010 Joo ....................... H04N 5/262 725/74

(Continued)

*Primary Examiner* — Alexander Gee
(74) *Attorney, Agent, or Firm* — Fletcher Yoder, P.C.

(57) ABSTRACT

In one embodiment, a processor implemented method is provided. The processor-implemented method includes receiving raw lighting information corresponding to one or more lighting events that occur during the creation of primary content, during association of supplemental effects on the primary content, or both. The processor-implemented method also includes decoding the raw lighting information to generate supplemental information. The supplemental information corresponds to one or more lighting cues. The processor-implemented method also includes associating the supplemental information with the primary content by linking each of the one or more lighting cues to each of the one or more lighting events.

21 Claims, 4 Drawing Sheets

(56) References Cited

U.S. PATENT DOCUMENTS

| | | | | |
|---|---|---|---|---|
| 2011/0154384 | A1* | 6/2011 | Kim | G11B 19/02 725/9 |
| 2012/0075538 | A1* | 3/2012 | Okuda | G08C 17/02 348/734 |
| 2013/0007809 | A1* | 1/2013 | Hays | H04N 21/4131 725/47 |
| 2013/0107122 | A1* | 5/2013 | Ha | H04N 21/84 348/563 |
| 2013/0124638 | A1* | 5/2013 | Barreto | G06F 15/16 709/205 |
| 2013/0170813 | A1* | 7/2013 | Woods | H04N 5/765 386/200 |
| 2013/0198786 | A1* | 8/2013 | Cook | H05B 37/0272 725/81 |

* cited by examiner

SYSTEMS AND METHODS FOR PROVIDING IMMERSIVE MEDIA CONTENT

BACKGROUND

The present disclosure relates generally to the field of digital content for the delivery of video, audio and multimedia content, and more particularly to techniques for the delivery of digital content synchronized with supplemental information to provide a viewer with an immersive viewing experience.

The field of digital content delivery has undergone substantial changes in recent years. Traditional media included, for example, broadcast television, cinema, physical supports for audio recording and playback, and so forth. These industries have been revolutionized by the ability to store, transmit, deliver and play back content of interest to wider ranges of audiences by digital means. Current technologies include, for example, traditional broadcast technologies, satellite transmission, cable delivery systems, cellular transmission systems, Internet delivery systems, as well as a range of physical memory supports for receiving, storing and playing back content. In many cases, digital content has evolved to allow audiences greater control over their viewing experience, so that they are able to enjoy digital content within the comfort of their surroundings.

An area of increasing interest in the field relates to adapting digital content to provide audiences with a more immersive viewing experience. Current techniques for providing digital media commonly pairs different types of media for audience consumption. For example, video data is commonly paired with audio signals to provide voice, music, sound effects, and so forth. Accordingly, there is an increased interest and need for combining digital content with supplemental information (e.g., immersive information) that engages the audience and provides a more immersive viewing experience. In particular, the supplemental information may include information to regulate and/or control various factors found within the environment or surroundings of a typical viewer, such as light. In this manner, the digital content and supplemental information may be seamlessly stitched to "immerse" a viewing audience within a scene from the comfort of a viewer's surroundings.

To date, little or no progress has been made in combining and/or synchronizing digital content with supplemental information that controls factors within a viewer's surrounding environment. Because both forms of content will likely be of interest, there may be a need for systems and methods for combining them to enhance the audience experience and to provide for a more immersive viewing experience.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a processor implemented method is provided. The processor-implemented method includes receiving raw lighting information corresponding to one or more lighting events that occur during the creation of primary content, during association of supplemental effects on the primary content, or both. The processor-implemented method also includes decoding the raw lighting information to generate supplemental information. The supplemental information corresponds to one or more lighting cues. The processor-implemented method also includes associating the supplemental information with the primary content by linking each of the one or more lighting cues to each of the one or more lighting events.

In one embodiment, an electronic device is provided. The electronic device includes a processor configured to receive supplemental information corresponds to one or more lighting cues. The one or more lighting cues correspond to one or more lighting events of a primary content. The processor is also configured to decode the supplemental information to generate one or more command signals and transmit at least one of the one or more command signals to a lighting system disposed proximate to a viewer.

In one embodiment, a tangible, non-transitory, machine-readable medium, comprising machine-readable instructions is provided. The machine-readable instructions synchronize primary content with supplemental information by generating a synchronized content file that synchronizes one or more one or more lighting cues associated with one or more lighting events. The one or more lighting events occur during the creation of primary content, during association of supplemental effects on the primary content, or both. The machine-readable instructions also transmit the synchronized content file to a viewer environment via one or more content delivery systems. The one or more content delivery systems include an Internet-based content provider.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
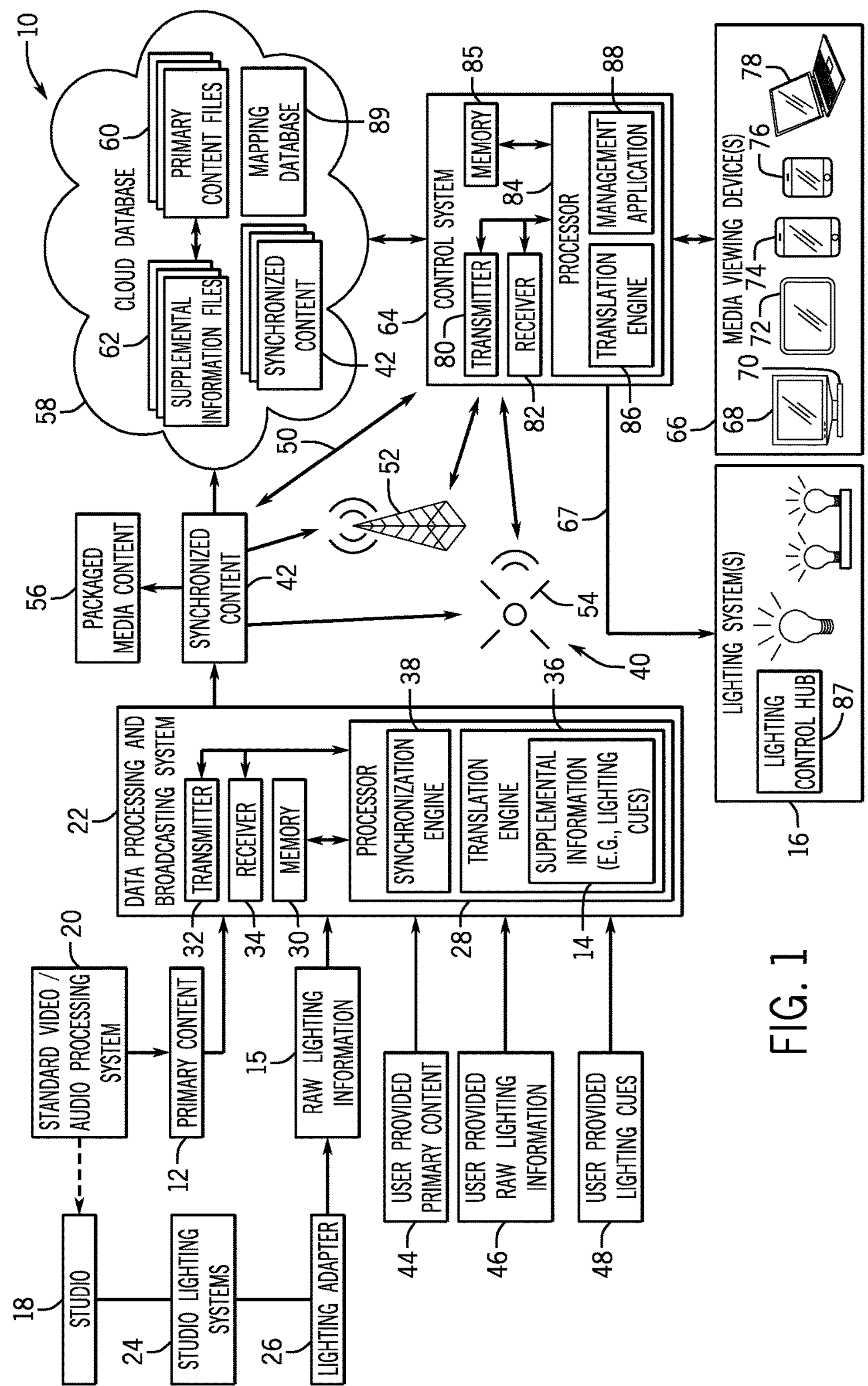
FIG. 1 is a diagrammatical representation of an exemplary media system that bundles and/or delivers primary content with supplemental information (e.g., lighting cues), in accordance with aspects of the present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Embodiments of the present disclosure generally relate to a media system that prepares, synchronizes, and delivers primary content, such as video, audio, multi-media, text, or other desired digital content, embedded with supplemental information. In particular, the supplemental information (e.g., immersive information) may provide audiences with a more immersive viewing experience when utilized in conjunction with the primary content. Specifically, the supplemental information may include information to regulate and/or control various external factors or systems found within the environment or surroundings of a viewer. In the illustrated embodiments and associated descriptions, a control system may receive and translate the supplemental information into one or more signals to control lighting systems within the environment of the viewer, thereby enhancing the primary content viewing experience. For example, the supplemental information may be derived from raw lighting information (e.g., lighting information obtained from a studio lighting control system) and may be associated with lighting cues that are synchronized with the primary content and triggered at various presentation time points within the primary content. The control system may engage one or more lighting systems within the viewer's environment when the supplemental information is triggered, thereby incorporating the viewer's environment into the viewing experience. In some situations, the control system may utilize the supplemental information to manipulate the lighting systems within the viewer's environment such that they mimic or otherwise enhance the lighting effects of the primary content.

In certain embodiments, the media system may synchronize and combine real-time primary content with real-time supplemental information to provide a remote audience with a more immersive viewing experience. In such situations, the supplemental information may be derived from raw lighting information obtained from lighting systems of primary content occurring in real-time (or close to real-time). Indeed, the raw lighting information may be processed and decoded to generate the supplemental information (e.g., the lighting cues). For example, the media system may include a processing and broadcasting system that derives lighting cues from raw lighting information obtained from lightings systems of live studio shows, live award shows, live sporting or entertainment events, real-time news or events, and so forth. Further, the processing and broadcasting system may synchronize the generated supplemental information (e.g., lighting cues) with the primary content (e.g., video, audio, multi-media, text, or any other desired digital content), and deliver the synchronized primary and supplemental information to the audience in real time. Viewers may receive the primary content of the synchronized content with a variety of media devices (e.g., a tablet computing device, computer, television, etc.). In particular, a control system disposed within or otherwise communicatively coupled to, or at least in synchronization with, the media device may receive and translate the supplemental information into one or more command signals. Further, the control system may transmit the one or more command signals to lighting systems (e.g., lighting fixtures, lighting accessories, home theater systems, etc.) disposed proximate to the viewer. Particularly, the control system may manipulate the lighting systems within the viewer's surroundings to correspond with the primary content displayed on the media devices, thereby providing an immersive viewing experience for the viewer.

In certain embodiments, the media system may synchronize primary content with supplemental information, and may provide this combined content for viewing at a time that is shifted from a broadcast time slot, or at a time that corresponds to no particular schedule, such as in the case of delayed playback, playback of stored content, and so forth. In such situations, the raw lighting information may be auto-generated and/or received via user input. As noted above, the processing and broadcasting system of the media system may process and decode the raw lighting information to generate the supplemental information (e.g., lighting cues) and synchronize the supplemental information with primary content (e.g., video, audio, multi-media, text, or any other desired digital content). The synchronized content may be stored within various content storage sources, such as disk readers, solid state memory, cloud computing services, third-party storage and/or playback systems, pre-packaged media content, and so forth. Particularly, all of these sources may be capable of providing the synchronized content to a viewer's media device at a known or unknown time. Further, as noted above, a control system disposed within or otherwise communicatively coupled to a viewer's media device may receive and translate the supplemental information into one or more command signals that manipulate lighting systems (e.g., lighting fixtures, lighting accessories, home theater systems, etc.) proximate to the viewer. In this manner, the media system may be deliver primary and supplemental information to a viewer to provide the viewer with an immersive viewing experience.

The illustrated embodiments and associated descriptions describe the supplemental information as it relates to controlling lighting systems within the environment of the viewer. However, it should be noted that in other embodiments, the techniques described herein may be utilized for supplement content that relates to controlling or manipulating other environmental factors in the viewer's surroundings. For example, other environmental systems that may be controlled to provide a more immersive viewing experience may include temperature sensors and environmental control settings for the environment, home theatre systems, audio equipment, virtual reality systems or accessories, and so forth. Indeed, any device or system in the viewer's environment that may be utilized to enhance the viewing experience of audience may be manipulated with supplemental information combined with primary content in the manner described below.

Turning now to the drawings, FIG. 1 illustrates an exemplary media system 10 that creates, prepares, delivers, and playbacks primary content 12 synchronized with supplemental information 14. As noted above, primary content 12 may include video, audio, multi-media, text, television and film programming, combined audio and video content, or any other desired digital or media content provided to audiences. In certain situations, the supplemental information 14 may be synchronized and/or embedded with primary content 12, so that elements of the primary content 12 may be played or experienced with external factors found in the viewer's environment (e.g., light). Specifically, the supplemental information 14, also referred to as "immersive information," may be associated with lighting cues. In certain situations, supplemental information 14 may be translated into command signals that regulate and/or control various external factors or systems found within a viewer's environment or surroundings. For example, in the illustrated embodiment, the supplemental information 14 may be translated to generate command signals that regulate or control lighting systems 16 found within the viewer's environment, as further described in detail below.

In certain embodiments, the media system 10 may synchronize and combine primary content 12 obtained in real-time with supplemental information 14 obtained in real-time to provide a remote audience with a more immersive viewing experience. For example, in certain contexts, primary content 12 occurring live at a studio 18 (e.g., theaters, entertainment venues, productions in front of a live audience, etc.) may be captured by a standard video/audio processing system 20. The standard video/audio processing system 20 may include various cameras, audio capturing systems, fixtures, mountings, one or more programmed computers, that themselves include digital processors, supporting memory, programs for processing the video data, codecs for encoding the data, processing algorithms for handling audio signals captured by or in association with the cameras, and so forth. The primary content 12 obtained may be provided to a data processing and broadcasting system 22 for further processing and synchronization with the supplemental information 14.

The data processing and broadcasting system 22 may include a processor 28, an associated memory 30, a transmitter 32, and a receiver 34. The data processing and broadcasting system 22 may include multiple components as illustrated and described herein, or in certain embodiments such components may be provided in separate devices that are used in conjunction with one another. In certain embodiments, the receiver 34 of the data processing and broadcasting system 22 receives the primary content 12 from standard video/audio processing system 20. Further, the data processing and broadcasting system 22 receives raw lighting information 15 (e.g., from studio lighting systems 24). In particular, the studio 18 may include lighting systems 24 (e.g., lighting consoles, lighting boards, lighting desk, etc.) that are used to simultaneously control multiple lighting elements (e.g., lighting fixtures, smart lights, moving lights, dimmers, lighting panels, etc.) of the studio 18. For example, typical lighting systems 24 may control the intensity, the movement, the color, the shape, the timing, and/or the patterns (e.g., gobo patterns, strobe effects, etc.) of the lighting elements disposed around the studio 18. In certain situations, the lighting systems 24 may also regulate various lighting special effects devices, such as fog machines or hazers. In particular, the lighting systems 24 may utilize various electronics protocols to simultaneously control and regulate multiple lighting elements that are found within the studio 18. In certain embodiments, a digital multiplex protocol (DMX512) may be utilized, while in other embodiments, other protocols, such as an 0-10 V lighting control protocol, an architecture for control networks (ACN) protocol, or a DMX512-A protocol, may be used.

In the illustrated embodiment, a lighting adapter 26 may couple the studio lighting system 24 to the data processing and broadcasting system 22. It should be noted that in certain situations, the lighting adapter 26 may be combined with the receiver 34 of the data processing and broadcasting system 22, such that the receiver 34 receives information directly from the studio lighting systems 24. The lighting adapter 26 may convert the various electronics protocol information (e.g., DMX512) of the lighting systems 24 into the raw lighting information 15. Further, the data processing and broadcasting system 22 includes a translation engine 36 that decodes and translates the raw lighting information 15 into supplemental information 14. Specifically, as noted above, the translation engine 36 may process and decode the raw lighting information into one or more lighting cues.

A lighting cue may be a reference to a particular lighting event and/or effect (e.g., an intensity, a movement, a color, a shape, a timing, and/or a lighting pattern) of one or more studio lighting elements that corresponds to a presentation time within the primary content 12. For example, a lighting cue can correspond to the dimming of a lighting element on the studio 18 that is executed at a particular time or in a particular sequence of the primary content 12 (e.g., obtained video/audio data). In particular, the translation engine 36 may utilize an algorithm and various lookup databases to convert raw lighting information 15 from the studio lighting systems 24 into the supplemental information 14 (e.g., the lighting cues). For example, given a set of Digital Multiplex 512 (DMX512) values, the translation engine 36 may determine the type of lighting fixtures within the studio 18 the DMX512 values are associated with. In certain embodiments, the translation engine 36 may convert the supplemental information 14 into a data-messaging format that may be transmitted to various content delivery systems 40, which may then broadcast the information to a wide range of audiences, as further described below. Indeed, the translation engine 36 may convert the supplemental information 14 and/or the primary content 12 into an appropriate data-messaging format. The data-messaging format may be conducive for transmission by the transmitter 32 to one or more content delivery systems 40, as further described below. Particularly, as further described with respect to FIG. 4 and FIG. 5, the supplemental information 14 may be embedded into the primary content 12 and/or may be linked to the primary content 12 via one or more trigger markers.

The processor 12 may include a synchronization engine 38 to synchronize the data-messaging formats of the primary content 12 and the supplemental information 14 to form synchronized content 42. For example, the synchronization engine 38 may be designed to synchronize the supplemental information 14, associated with one or more lighting cues, with the primary content 12 based on when certain lighting events were executed during the live primary content 12 or based on when the certain lighting events should be triggered when a viewer is viewing the primary content 12. Synchronizing the data-messaging formats of the supplemental information 14 with the primary content 12 may further ensure that the supplemental information 14 and the one or more lighting cues derived from the raw lighting information 15 is timed to enhance the experience of the audience receiving and consuming the primary content 12. In certain embodiments, the synchronization engine 38 may receive the data-messaging formats of the primary content 12 and supplemental information 14 from the translation engine 36, and may then link these data-messaging formats together for combined transmission. Accordingly, the synchronization engine 38 may generate the synchronized content 42, which may then be transmitted by the transmitter 32 to one or more content delivery systems 40, as further described below.

In certain embodiments, the data processing and broadcasting system 22 may receive user-provided primary content 44 and user-provided raw lighting information 46. Particularly, the user-provided primary content 44 may be a media file that includes video, audio, multi-media, text, or any other desired digital content for audience consumption. Likewise, the user-provided raw lighting information 46 may be associated with lighting information captured or otherwise obtained during creation of the user-provided primary content 44. For example, in certain situations, the user-provided raw lighting information 46 may be created by utilizing the format and/or protocol of the translation engine 36. In this manner, the user-provided raw lighting information 46 may be created and provided to the data processing and broadcasting system 22 in an appropriate format. Similar to the supplemental information 14 derived from the studio lighting systems 24, the translation engine 36 of the data processing and broadcasting system 22 may decode and process the user-provided raw lighting information 46 into the supplemental information 14 (e.g., one or more lighting cues), and may convert the supplemental information 14 and the user-provided primary content 44 into appropriate data-messaging formats. Further, the synchronization engine 38 of the data processing and broadcasting system 22 may synchronize the user-provided primary content 44 with the supplemental information 14 to generate the synchronized content 42. In certain embodiments, the data processing and broadcasting system 22 may receive user-provided lighting cues 48, which may or may not need to be decoded and/or processed by the translation engine 36. In these situations, the synchronization engine 38 may synchronize the user-provided primary content 44 with the user-provided lighting cues 48.

A variety of content delivery systems 40 may receive and distribute the synchronized content 42 to audiences. Such content delivery systems 40 may include or be adapted for two-way communication. That is, one or more content streams may be "pushed" to the audience, and this may occur at the same or different times, depending upon the technologies for distribution. Where two-way communications are provided, such as via certain satellite, cable, Internet and similar systems, data may be retrieved by the audience via the same and/or alternative channels. The content delivery systems 40 may include television broadcast companies, cable providers, satellite programming providers, Internet-based content providers, radio stations, or any other providers of digital content. The illustrated embodiment depicts any one of a range of technologies that may be used for delivering the synchronized content 42 to the audiences. For example, the Internet 50, broadcast technologies 52, and wired or wireless proprietary networks, such as cable and satellite technologies 54, may be utilized to transmit the synchronized content 42. In certain embodiments, the content delivery systems 40 may be utilized to transmit only the supplemental information 14, while the primary content 12 is transmitted through typical or conventional systems.

In certain embodiments, the synchronized content 42 may be distributed as package media content 56, such as CDs, Blu-ray discs, DVDs, or other optically-readable media. Further still, in certain embodiments, the synchronized content 42 may be stored within a cloud database 58 (e.g., cloud services 58), which may assist in the storage and distribution of the synchronized content 42. It should be noted that in certain embodiments, the cloud database 58 may include a wide variety of synchronized content 42 that is ready for viewer retrieval and consumption. Particularly, in certain embodiments, the synchronized content 42 may be stored as combined files with supplemental information 14 and primary content 12 are linked. In other embodiments, the synchronized content 42 may be stored as individual primary content files 60 and individual supplemental information files 62, but may be associated within the cloud database 58 via tags or markers. Other technologies may be employed, including cellular technologies, various wireless technologies, and so forth, to provide the synchronized content 42 (or a portion of the synchronized content 42 (e.g., the primary content 12 and/or the supplemental content 14) to audiences.

The synchronized content 42 (or a portion of the synchronized content 42) may be received by an audience through a control system 64 and/or through one or more media viewing devices 66. In certain embodiments, the control system 64 may be a component of one or more media viewing devices 66 and/or may be otherwise communicatively coupled to one or more media viewing devices 66. Accordingly, audiences may view the primary content 12 of the synchronized content 42 on media viewing devices 66 adapted for playing video, audio, or multi-media content. Further, the control system 64 may receive and translate the supplemental information 14 of the synchronized content 14 into one or more signals to control lighting systems 16 within the environment of the viewer, thereby enhancing the viewing experience of the primary content 12. Indeed, as noted above, the supplemental information 14 may be associated with one or more lighting cues, such that each of the one or more lighting cues are synchronized to a particular presentation time of the primary content 12. Accordingly, the control system 64 may further decode and process the supplemental information 14 to ensure that the one or more generated command signals 67 are synchronous with the one or more lighting cues.

In certain embodiments, the media viewing devices 66 may include collective devices, such as cinemas and public displays. In most situations, however, the media viewing devices 66 may be provided in homes, businesses, automobiles, or other more limited venues. Indeed, audiences may be typically viewing the primary content 12 within the comfort of their homes or businesses. The media viewing device 66 may be a conventional television set 68 associated with a processing system, such as a cable, satellite, or set-top box 70 (referred to hereinafter as the cable box 70). As will be appreciated by those skilled in the art, the cable box 70 may serve to receive and decode the primary content 12 and provide audio and visual signals to the television monitor and speakers for playback. In certain embodiments, the control system 64 may be disposed within the cable box 70, and may receive and decode the supplemental information 14, generate command signals, and transmit the command signals to the lighting systems 16 disposed within the viewer's environment.

In certain embodiments, the media viewing device 18 may be an Internet-ready television set 72 that is adapted to receive, retrieve, and/or process the primary content 12. In both of these scenarios, various supplemental devices, including modems, routers, streaming media devices, computers, and so forth may be associated with the sets to provide enhanced functionality (these devices are not separately illustrated in the figure). In addition, hand-held computing devices 74 (e.g., tablets, hand-held computers, hand-held media players, etc.), smartphones 76, or personal computing devices 78 (e.g., computers, laptops, etc.) may be utilized to receive, retrieve, decode, play back, or store the primary content 12. In certain situations, the media viewing devices 66 may be adapted for receipt and playback of content in real time or near-real time as the primary content 12 is distributed. However, where storage and time-shifting techniques are utilized, timing is much more flexible. Where Internet distribution and other individualized content demand and receipt technologies are utilized, the primary content 12 may be requested, distributed and played back in a highly individualized manner.

As noted above, the control system 64 may receive and translate the supplemental information 14 of the received synchronized content 14 into one or more command signals 67 that control lighting systems 16 within the environment of the viewer. As noted above, the lighting systems 16 may be manipulated synchronously during playback of the primary content 12 to enhance the viewing experience of the primary content 12. Specifically, the control system 64 may include a transmitter 80, a receiver 82, a processor 84, and an associated memory 85. The receiver 82 may receive the synchronized content 42 from the content delivery systems 40, and more specifically, may receive the supplemental information 14 of the synchronized content 42.

In particular, a translation engine 86 of the control system 64 may process and translate the received supplemental information 14 into one or more command signals 67, such that each of the one or more command signals 67 are synchronous with one or more lighting cues. Particularly, the translation engine 86 of the control system 64 may translate the supplemental information 14 into commands that firmware of the lighting systems 16 recognize. The command signals 67 may control the lighting systems 16 disposed within a viewer's environment, thereby incorporating the viewer's environment into the viewing experience. Specifically, the control system 64 and the media viewing devices 66 may work to simultaneously provide the primary content 12 and engage one or more lighting systems 16 within the viewer's environment when the supplemental information 14 is triggered. In this manner, one or more lighting systems 16 (e.g., lighting fixtures, lighting accessories, home theater systems, smart home systems and networks, etc.) disposed proximate to the viewer may be incorporated into the viewer's viewing experience. In certain embodiments, the lighting system 16 within the viewer's environment may include a lighting control hub 87 that is configured to receive the commands from the control system 64. In certain embodiments, a single lighting control hub 87 may be associated with one or more lighting systems 16 typically found within the viewer's environment. In other embodiments, each lighting system 16 may include a lighting control hub 87. In certain embodiments, the lighting control hub 87 may be configured to receive the command signals from the control system 64 and transmit the received commands to one or more lighting features within the viewer's environment via one or more lighting protocols.

Accordingly, the media system 10 may be configured to substantially translate features of the lighting elements disposed around the studio 18 into the surroundings of the viewer. Specifically, the lighting systems 16 disposed within the viewer's environment may be able to mimic the intensity, the movement, the color, the shape, the timing, and/or the patterns of the lighting elements disposed around the studio 18. In this manner, the media system 10 may be configured to substantially immerse the viewer into a particular primary content 12. It should be noted that in certain situations, the lighting systems 16 disposed in the viewer's environment may not be equipped to mimic professional studio lighting systems and elements. Accordingly, in certain embodiments, the control system 64 may be a flexible system that utilizes an inventory of the available viewer lighting systems 16 within the viewer's environment to implement the supplemental information 14 derived from the raw lighting information 15 of the studio 18. For example, the control system 64 may omit certain lighting cues of the supplemental information 14 and/or may convert certain lighting cues into command signals 67 that may be reasonably implemented via the lighting systems 16. In certain embodiments, the lighting control hub 87 may omit certain command signals 67 received and/or may convert certain command signals 67 so that they are reasonably implemented with the lighting systems 16 and/or other lighting features. In one example, if a particular luminance value described by a lighting cue cannot be met by one lighting system 16, the control system 64 and/or the lighting control hub 87 may activate additional lighting systems 16 to reach the particular luminance value within the viewer's environment.

Accordingly, the lighting cues of the supplemental information 14 may be implemented according to the confines of the lighting systems 16 disposed within the viewer's environment. In certain embodiments, the control system 64 may have access to a mapping database 89 stored within the cloud database 58. The mapping database 89 may include associations or pairings between the lighting cues derived from various studio lighting systems 24 and the lighting systems 16 of the viewer's environment. For example, the mapping database 89 may include information about which lighting system 16 disposed within the viewer's environment works well with which studio lighting system 24. The association or pairing may be determined according to which lighting system 16 is best able to mimic or execute a lighting cue derived from the studio lighting system 24. In certain embodiments, the mapping database 89 may include information about substitutions that the control system 64 and/or the lighting control hub 87 may make in situations where the paired lighting system 16 is not available within the viewer's environment. In certain embodiments, the mapping database 89 may be disposed within the memory 85 of the control system 64. Accordingly, the control system 64 and/or the lighting control hub 87 may utilize the mapping database 89 to generate the one or more commands 67.

In certain embodiments, the processor 84 of the control system 64 may include a management application 88 that a viewer or audience can use to view and retrieve synchronized content 42, supplemental information files 62, and/or primary content files 60 form the cloud database 58. Indeed, features of the techniques described herein result from scheduled broadcasts, while others may be "on demand", such as via subscription, via the Internet, and so forth. Further, the supplemental information 14 may be manipulated or otherwise personalized by a viewer or user before being utilized with the lighting systems 16.

Figure 2:
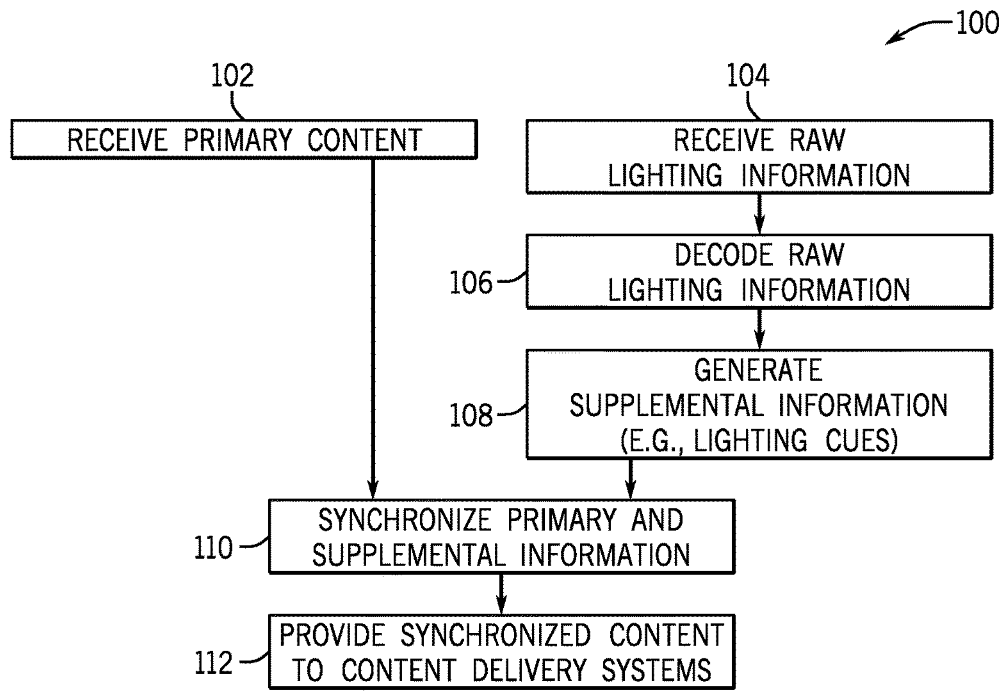
FIG. 2 is a flowchart of a process for providing synchronized content to various content delivery systems, in accordance with aspects of the present embodiments.

FIG. 2 is a process 100 for providing the synchronized content 42 to various content delivery systems 40, in accordance with aspects of the present embodiments. The process 100 begins with the data processing and broadcasting system 22 receiving the primary content 12 (step 102). As noted above, the primary content 12 may be any type of video, audio, multi-media, text, television and film programming, combined audio and video content, or other desired digital content. In certain embodiments, the primary content 12 may be created on the studio 18 and obtained by the data processing and broadcasting system 22 from the standard video/audio processing system 20. In other embodiments, the primary content 12 may be previously created and provided via user-input to the data processing and broadcasting system 22.

The process 100 further includes the data processing and broadcasting system 22 receiving the raw lighting information 15 (step 104). In certain embodiments, the raw lighting information 15 may be obtained from studio lighting elements disposed around the studio 18 (or other sources of lighting control associated with the primary content). For example, studio lighting systems 24 may control studio lighting elements (e.g., lighting fixtures, smart lights, moving lights, dimmers, lighting panels, etc.) to provide lighting effects during a studio production. Indeed, typical lighting systems 24 may control the intensity, the movement, the color, the shape, the timing, and/or the patterns (e.g., gobo patterns) of the lighting elements disposed around the studio 18. The lighting systems 24 utilize various electronics protocols (e.g., DMX512, 0-10 V lighting control, Architecture for Control Networks (ACN), DMX512-A, etc.) to simultaneously control and regulate multiple lighting elements that are found within the studio 18. In certain embodiments, a lighting adapter 26 may be utilized to gather the raw lighting information 15 from the lighting systems 24.

In step 106, the process 100 includes decoding the raw lighting information 15 via a translation engine 36 of the data processing and broadcasting system 22. Specifically, in step 108, the process 100 includes translating the raw lighting information 15 into supplemental information 14. As noted above, the supplemental information 14 may be associated with one or more lighting cues that correspond to a particular lighting event (e.g., an intensity, a movement, a color, a shape, a timing, and/or a lighting pattern) during the creation of the primary content 12. Accordingly, the supplemental information 14 may be utilized to mimic the lighting event that occurred during the creation of primary content 12 during playback of the primary content 12.

In step 110, the process 100 includes synchronizing and/or associating the primary content 12 with the supplemental information 14 via a synchronization engine 38 and/or an association engine of the data processing and broadcasting system 22. In particular, the synchronization engine 38 and/or association engine may be configured to generate the synchronized and/or associated content 42 that links the primary content 12 with the supplemental information 14. For example, in certain embodiments, the synchronization engine 38 and/or association engine may embed the supplemental information 14 into the primary content 12 while in other embodiments, the synchronization engine 38 and/or association engine may utilize one or more tags or markers to link the supplemental information 14 with the primary content 14.

Accordingly, in step 112, the process 100 includes providing the synchronized content 42 to the transmitter 32 of the date processing and broadcasting system 22, such that the synchronized and/or associated content 42 is transmitted to one or more content delivery systems 40. It should be noted that in certain embodiments, the data processing and broadcasting system 22 may transmit the primary content 12 and the supplemental information 14 separately. For example, in certain situations, the primary content 12 may be provided to audiences via typical broadcasting methods, while the supplemental information 14 (e.g., one or more lighting cues) may be provided via the media system 10. In such embodiments, the control system 64 of the viewer may be configured to receive and synchronize the primary content 12 and the supplemental information 14, as further described below with respect to FIG. 3.

Figure 3:
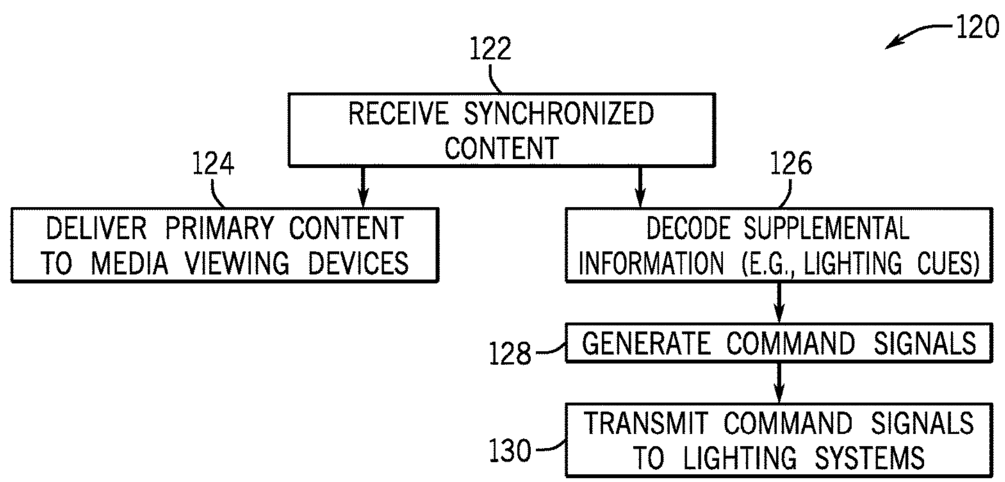
FIG. 3 is a flowchart of a process for controlling lighting systems disposed within a viewer's environment based on received synchronized content, in accordance with aspects of the present embodiments.

FIG. 3 is a process 120 for controlling lighting systems 16 disposed within a viewer's environment based on received synchronized and/or associated content 42, in accordance with aspects of the present embodiments. The process 120 beings with a control system 64 associated with a viewer or an audience receiving the synchronized and/or associated content 42 from one or more content delivery systems 40. As noted above, in certain embodiments, the control system 64 be a component of one or more media viewing devices 66 and/or may be otherwise communicatively coupled to one or more media viewing devices 66. Accordingly, the primary content 12 received may be provided to the media viewing devices 66 (step 124). In certain situations, the control system 64 may be a component of a cable box 70 associated with a conventional television set 68. Accordingly, in such embodiments, the control system 64 and the cable box 70 may be configured to receive the synchronized and/or associated content 42 from the one or more content delivery systems 40. The conventional television set 68 associated with the cable box 70 may be configured to provide audio and visual signals related to the primary content 12 while the control system 64 may be configured to further process the supplemental information 14.

Specifically, in steps 126 and 128, the process 120 includes the control system 64 decoding the supplemental information 14 and translating the supplemental information 14 into one or more commands signals 67. As noted above, the supplemental information 14 may be associated with one or more lighting cues that correspond to lighting events within the primary content 12. Specifically, the control system 64 may generate the one or more command signals 67 such that the firmware associated with the lighting systems 16 can recognize and implement the command signals 67. In certain embodiments, the control system 64 may obtain vendor information from various light systems 16 in order to obtain instructions for generating the command signals 67. In this manner, the process 120 transmits one or more command signals to manipulate lightings systems 16 disposed within a viewer's surrounding, thereby incorporating the viewer's environment into the viewing experience.

Figure 4:
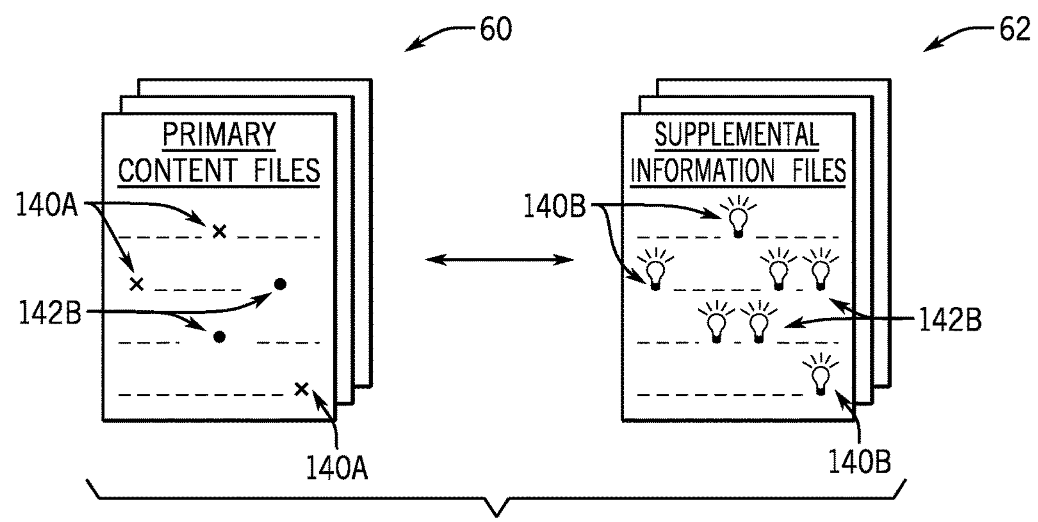
FIG. 4 is a diagrammatical representation of an exemplary manner of synchronizing one or more primary content files with one or more supplemental information files, in accordance with aspects of the present embodiments.

FIG. 4 is a diagrammatical representation of one or more primary content files 60 synchronized with one or more supplemental information files 62, in accordance with aspects of the present embodiments. Specifically, as noted above, the synchronization engine 38 of the data processing and broadcasting system 22 may be designed to synchronize the supplemental information 14, associated with one or more lighting cues, with the primary content 12. The synchronization may be based on when certain lighting events were executed during the primary content 12 and/or based on when the certain lighting events should be triggered when a viewer is utilizing the primary content 12.

Accordingly, in certain embodiments, the synchronization engine 38 may link the primary content 12 and the supplemental information 14 via one or more markers 140A and/or tags 142A. For example, as depicted in the illustrated embodiment, a marker 140A disposed within the primary content file 60 may correspond to a particular lighting event and/or lighting effect 140B in a supplemental information file. Likewise, a location within the primary content 12 that is associated with a tag 142A may correspond to a corresponding location and/or other reference and/or cue 142B within the supplemental information file 62, which may indicate the use of a particular lighting event and/or lighting effect. In certain embodiments, different markers 140A or tags 142B may be utilized to correspond to different types of lighting systems or features (e.g., lighting events, lighting fixtures, lighting panels, a light intensity, a light color, a light shape, a sequence or timing of lighting events, a pattern of the lighting elements, etc.). In this manner, when a primary content file 60 is being played on the media viewing device 66 and a lighting event is triggered, the control system 64 may utilize the one or more reference markers 140A or tags 142A to reference the corresponding instructions on the supplemental information file 62.

Figure 5:
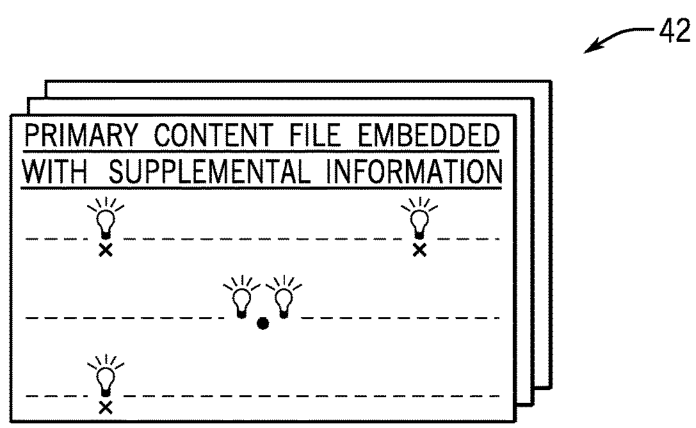
FIG. 5 is a diagrammatical representation of an exemplary manner of embedding supplemental information within primary content, in accordance with aspects of the present embodiments.

FIG. 5 is a diagrammatical representation of an exemplary manner of synchronized content 42 that embeds the supplemental information 14 into the primary content file 60, in accordance with aspects of the present embodiments. In certain embodiments, the supplemental information 14 associated with one or more lighting cues may be embedded into the primary content file 60. Accordingly, when the primary content file 60 is read or utilized by the media viewing device 66 and a lighting event is triggered, the control system 64 may utilize the one or more reference markers 140 or tags 142 within the primary content file 60 to find and implement instructions corresponding to the supplemental information 14.

Figure 6:
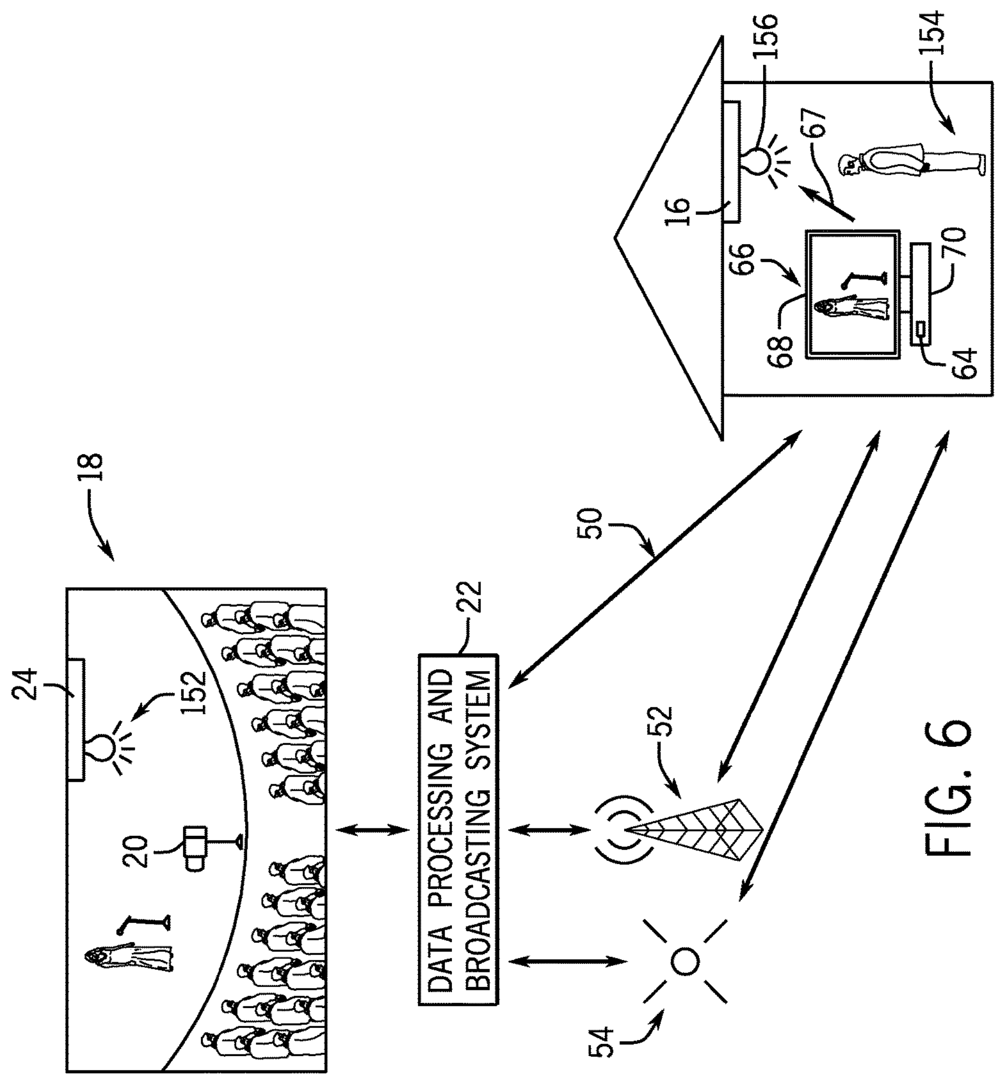
FIG. 6 is an illustration of a user experience, such as on a media viewing device, in accordance aspects of the present embodiments.

FIG. 6 is an illustration of a user experience 150, such as on media viewing device 66, in accordance aspects of the present embodiments. Specifically, in the illustrated embodiment, the primary content 12 is created live at the studio 18. For example, in certain embodiments, the primary content 12 may be an event or production in front of a live studio audience. One or more standard video/audio processing systems 20 may be configured to capture live audio and/or video information. Indeed, the standard video/audio processing systems 20 may include various cameras, audio capturing systems, fixtures, mountings, one or more programmed computers, and so forth. The primary content 12 obtained may be provided to a data processing and broadcasting system 22 for further processing and synchronization with the supplemental information 14.

In addition to the creation of primary content 12, the supplemental information 14 may be created and captured. For example, the studio 18 includes one or more studio lighting systems 24 (e.g., lighting consoles, lighting boards, lighting desk, etc.) that are used to simultaneously control multiple lighting elements 152 (e.g., lighting fixtures, smart lights, moving lights, dimmers, lighting panels, etc.). In particular, a lighting adapter 26 may convert the various lighting systems 24 information into the raw lighting information 15, and provide the raw lighting information 15 to the data processing and broadcasting system 22. The data processing and broadcasting system 22 may include a translation engine 36 configured to decode and translate the raw lighting information 15 into supplemental information 14 associated with one or more lighting cues. Further, the data processing and broadcasting system 22 may include a synchronization engine 38 to synchronize the primary content 12 and the supplemental information 14, and provide the synchronized content to one or more content delivery systems 40 (e.g., the Internet 50, broadcast technologies 52, cable and satellite technologies 54, etc.).

A viewer 154 may receive the synchronized content 42 through a control system 64 disposed within a media viewing device 66 (e.g., a conventional television set 68 associated with the cable box 70). The control system 64 may receive and translate the supplemental information 14 of the received synchronized content 14 into one or more command signals 67. As noted above, the command signals 67 may be configured to manipulate one or more lighting systems 16 within the surroundings of the viewer 154. For example, the command signals 67 may trigger various lighting elements 156 within the viewer's surroundings, such as home lighting fixtures, lighting accessories, home theater systems, thereby incorporating external factors of the viewer's environment into the viewing experience.

In one example, such as in a live reality singing competition with live performances, the background lighting effects may change colors, shades, or patterns (e.g., a dim blue color may be presented on stage). Using the apparatus and techniques described herein, the lighting systems 16 within the viewer's environment may mimic the dim blue lighting of the studio 18. As the performer finishes and the focus transitions to a host and/or judges of the show, the studio lighting elements 156 may transition to a bright warm white, which may again be mimicked by the lighting systems 16 within the viewer's environment. Thus, the viewer may be immersed within the viewing experience by being provided a simulated environment that is tied to the primary content 12 that is currently being observed.

While only certain features of the present disclosure have been illustrated and described herein, many modifications and changes will occur to those skilled in the art. For example, while the current specification typically uses the term synchronization of content to denote that the supplemental information 14 is tied to the primary content 12, in certain embodiments, association of supplemental information 14 with the primary content 12 may not necessarily synchronized, but instead associated with the primary content 12. Additionally, while example uses described herein relate to raw-lighting information that is sourced from studio lighting controls, the lighting source control may be from only a portion of the studio (e.g., the stage portion and/or the audience portion of the studio) or may be sourced from lighting controls that are not associated with the studio. It is, therefore, to be understood that the appended claims are intended to cover all such modifications and changes as fall within the true spirit of the present disclosure.

The invention claimed is:

1. A processor-implemented method, comprising:

receiving, from one or more hardware control elements of one or more studio lighting systems comprising one or more lighting devices that emit light to produce lighting effects, electronics protocol information conforming to an electronics protocol, the electronics protocol information configured to control, regulate, or both a plurality of lighting elements of the one or more studio lighting systems in a studio according to a first set of one or more lighting events, lighting effects, or both wherein the plurality of lighting elements are introduced into primary content during creation of the primary content in the studio;

converting the electronics protocol information into raw lighting information related to the first set of one or more lighting events, lighting effects, or both;

decoding the raw lighting information into supplemental information, wherein the supplemental information comprises one or more lighting cues that are a reference to the first set of one or more lighting events, lighting effects, or both; and associating the supplemental information with the primary content, by synchronizing the one or more lighting cues with the primary content, such that the one or more lighting cues trigger a second set of one or more lighting events, lighting effects, or both in an environment separate from the studio, based upon the first set of one or more lighting events, lighting effects, or both.

2. The processor-implemented method of claim 1, comprising generating an associated content file comprising the primary content and the supplemental information.

3. The processor-implemented method of claim 2, comprising transmitting the associated content file, via one or more content delivery systems, for viewer consumption.

4. The processor-implemented method of claim 1, comprising creating the primary content and the first set of one or more lighting events, lighting effects, or both during a live broadcast event.

5. The processor-implemented method of claim 1, comprising generating a primary content file comprising the primary content and a supplemental information file comprising the supplemental information.

6. The processor-implemented method of claim 5, comprising linking the primary content with the supplemental information by embedding one or more markers, one or more tags, or both in the supplemental information file, the primary content file, or both.

7. The processor-implemented method of claim 5, comprising generating and storing a plurality of primary content files for a plurality of primary content and a plurality of supplemental information files for a plurality of supplemental information associated with the plurality of primary content within a cloud database.

8. An electronic device, comprising:

a processor, configured to:

receive supplemental information corresponding to one or more lighting cues, wherein the one or more lighting cues are associated with one or more hardware control elements of a studio lighting system comprising one or more lighting devices that emit light to produce lighting effects that introduces a first set of one or more lighting events, lighting effects, or both into primary content during the creation of the primary content in the studio, wherein the supplemental information is based on decoded raw lighting information converted from electronics protocol information of the studio lighting system, wherein the electronics protocol information conforms to an electronics protocol and is configured to control, regulate, or both the studio lighting system that is used during the creation of the primary content in the studio;

decode the supplemental information to generate one or more command signals, such that the one or more command signals trigger a second set of one or more lighting events, lighting effects, or both of a lighting system in a viewer environment separate from the studio; and transmit at least one of the one or more command signals to the lighting system disposed in the viewer environment.

9. The electronic device of claim 8, wherein the processor is further configured to receive the primary content via a media viewing device.

10. The electronic device of claim 9, wherein the processor is further configured to synchronize the primary content with the supplemental information prior to viewer consumption.

11. The electronic device of claim 9, wherein the processor is further configured to receive the supplemental information via one or more content delivery systems separate from the media viewing device.

12. A tangible, non-transitory, machine-readable medium, comprising machine-readable instructions to:

synchronize primary content with supplemental information, by generating a synchronized content file that synchronizes one or more lighting cues, received from one or more hardware control elements of a studio lighting system comprising one or more lighting devices that emit light to produce lighting effects, corresponding to a first set of one or more lighting events, lighting effects, or both introduced into the primary content during the creation of the primary content, wherein the supplemental information is based on decoded raw lighting information converted from electronics protocol information of the studio lighting system, wherein the electronics protocol information conforms to an electronics protocol and is configured to control, regulate, or both the studio lighting system that is used to generate the first set of one or more lighting events, lighting effects, or both during the creation of the primary content in the studio; and transmit the synchronized content file to a viewer environment separate from the studio via one or more content delivery systems, such that a second set of one or more lighting events, lighting effects, or both can be triggered in the viewer environment based on the synchronized content file, wherein the one or more content delivery systems comprises an Internet-based content provider.

13. The computer readable medium of claim 12, wherein the instructions instruct a computer to receive the primary content through user input.

14. The computer readable medium of claim 12, wherein the instructions instruct a computer to receive the raw lighting information from the studio lighting system configured to produce the first set of one or more lighting events, lighting events, or both and to decode the raw lighting information to generate the supplemental information.

15. The processor-implemented method of claim 1, comprising simulating the first set of one or more lighting events, lighting effects, or both that occur during the creation of the primary content within the environment separate from the studio.

16. The processor-implemented method of claim 15, comprising triggering one or more lighting elements within the environment separate from the studio to simulate the first set of one or more lighting events, lighting effects, or both that occur during the creation of the primary content.

17. The processor-implemented method of claim 16, wherein the one or more lighting elements comprise a lighting fixture, a lighting accessory, a home theater system, a smart home system, or a combination thereof.

18. The processor-implemented method of claim 1, wherein the electronics protocol comprises a digital multiplex protocol (DMX), an 0-10 V lighting control protocol, an architecture for control networks (ACN) protocol, or any combination thereof.

19. The processor-implemented method of claim 1, comprising:

causing transmission of the associated supplemental information with the primary content to an audience of the primary content, for subsequent control of a second lighting system of the audience of the primary content, based upon the one or more lighting cues.

20. The electronic device of claim 8, wherein the electronics protocol comprises a digital multiplex protocol (DMX), an 0-10 V lighting control protocol, an architecture for control networks (ACN) protocol, or any combination thereof.

21. The computer readable medium of claim 12, wherein the electronics protocol comprises a digital multiplex protocol (DMX), an 0-10 V lighting control protocol, an architecture for control networks (ACN) protocol, or any combination thereof.

* * * * *